United States Patent [19]
Watanabe

[11] Patent Number: 5,187,357
[45] Date of Patent: Feb. 16, 1993

[54] POSITION DETECTOR USING TWO DIMENSIONAL MULTI-ANODE PHOTOMULTIPLIER TUBE AND A PLURALITY OF COMPARATORS

[75] Inventor: Mitsuo Watanabe, Hamamatsu, Japan

[73] Assignee: Hamamatsu Photonics K.K., Hamamatsu, Japan

[21] Appl. No.: 842,488

[22] Filed: Feb. 27, 1992

[30] Foreign Application Priority Data

Feb. 27, 1991 [JP] Japan .................................. 3-55830

[51] Int. Cl.[5] .............................................. G01N 21/86
[52] U.S. Cl. .................................. 250/206.1; 250/561
[58] Field of Search ............... 250/206.1, 206.2, 203.6, 250/208.1, 561; 356/141, 152; 378/21

[56] References Cited

U.S. PATENT DOCUMENTS

| | | | |
|---|---|---|---|
| 4,501,366 | 2/1985 | Thompson | 250/566 |
| 4,703,168 | 10/1987 | Olson | 290/207 |
| 5,111,051 | 5/1992 | Watanabe | 250/363 |

FOREIGN PATENT DOCUMENTS 2161600 1/1986 United Kingdom .
2231740 11/1990 United Kingdom .

*Primary Examiner*—David C. Nelms
*Assistant Examiner*—T. Davenport
*Attorney, Agent, or Firm*—Sughrue, Mion, Zinn, Macpeak and Seas

[57] ABSTRACT

A position detector detects a light incident position on one of a plurality of scintillators with a photomultiplier having a number of anodes smaller in number than the scintillators and with a simple circuit configuration. A plurality of anodes are provided in one-to-two or one-to-three correspondence to the plurality of scintillators. An anode receiving photoelectrons is detected from a specific output produced from one of a plurality of first group comparators. Further, either one of two anodes adjacent the detected anode at which the major part of the photoelectrons are received is determined from the outputs of second comparators, whereby one of the plurality of scintillators can be identified.

10 Claims, 4 Drawing Sheets

POSITION DETECTOR USING TWO DIMENSIONAL MULTI-ANODE PHOTOMULTIPLIER TUBE AND A PLURALITY OF COMPARATORS

BACKGROUND OF THE INVENTION

1. Field of the Invention

The present invention relates to position detectors, and more particularly to a position detector suitable for use in conjunction with a positron CT (computed tomography) for detecting a scintillator's position on which a radiant ray is incident.

2. Description of Prior Art

A conventional position detector detects the scintillator's position on which a radiant ray is incident by way of a current to resistance relation. Specifically, with a photomultiplier tube having a plurality of anodes connected to one another with a resistor interposed between adjacent anodes, currents derived from the two end terminals are measured to determine the radiant ray incident position on the photocathode of the multiplier tube.

Japanese Patent Laid-Open Publication (hereinafter referred to as "OPI") No. 63-300986 discloses another type of a position detector for detecting a position of a light or radiant ray without carrying out computations. OPI No. 60-214287 discloses still another type of a position detector for used in a positron CT.

To improve the position detecting resolution, the position detection pursuant to the current to resistance relation requires an integration circuit for integrating the output signals obtained from the anodes and a processing circuit for computing the light incident position. This technique poses problems in accuracy of the number of photoelectrons counted and also in the complicatedness of the circuits required. Further problem exists such that the discretion of the illuminating points at the end portions of the photocathode are difficult in comparison with that of the illuminating points at the center of the photocathode.

The device disclosed in OPI No. 63-300986 is accurate in counting the number of photoelectrons and has a quick position detecting capability. However, the position detecting resolution is determined depending upon the number of anodes, since the light illuminating segments, e.g. discrete scintillation crystals, and the anodes need to be provided in one-to-one correspondence. If it is contemplated to improve the position detecting resolution with the use of a thin scintillator crystals, the number of anodes increase correspondingly and further the number of signal processing circuits increases a great deal.

The detector disclosed in OPI No. 60-214287 also poses a problem such that to improve the resolution, thin photomultiplier tubes corresponding to thin scintillation crystals are required.

SUMMARY OF THE INVENTION

The present invention has been made to solve the above-described problems accompanying in the conventional position detectors, and accordingly it is an object of the present invention to provide a position detector which is capable of detecting an illuminating position with a good photoelectron counting capability, less number of anodes, and with a simple circuit configuration.

To achieve the above and other objects, there is provided, according to one aspect of the invention, a position detector which includes a plurality of light illumination segments aligned to one another, and a plurality of photo-detectors provided in one-to-two correspondence to adjacent two of the plurality of light illumination segments. There are provided a plurality of first comparators connected to the outputs of the plurality of photo-detectors. Each first comparator compares the outputs of adjacent two photo-detectors and outputs a comparison result in the form of a binary signal having high or low level. There are further provided a plurality of second comparators connected to the outputs of the plurality of photo-detectors. Each second comparator compares the outputs of two photo-detectors disposed one photo-detector apart and outputs a comparison result in the form of a binary signal. An identifying circuit is provided which is connected to the outputs of the plurality of first comparators and the plurality of second comparators. The identifying circuit identifies one of the plurality of photo-detectors which provides a different output from outputs of the remaining photo-detectors and selects a high output level photo-detector from two photodetectors adjacent to the identified photo-detector based on an output of one of the plurality of second comparators which compares the outputs of two photo-detectors adjacent to the identified photo-detector. The identifying circuit further identifies one of the two light illumination segments corresponding to the identified photo-detector and disposed at a side of the higher output level photo-detector as the one on which a light is incident.

According to another aspect of the present invention, there is provided a position detector which includes a plurality of light illumination segments aligned to one another, and a plurality of photo-detectors provided in one-to-three correspondence to adjacent three of the plurality of light illumination segments. There are provided a plurality of first comparators connected to the outputs of the plurality of photo-detectors for comparing the outputs of adjacent two photo-detectors and outputting a comparison result in the form of a binary signal from an output of each of the plurality of first comparators. There are further provided a plurality of second comparators connected to the outputs of the plurality of photo-detectors for comparing outputs of two photo-detectors disposed one photo-detector apart and outputting a comparison result in the form of a binary signal. There are further provided a plurality of third comparators in one-to-one correspondence to the plurality of photo-detectors for comparing the outputs of the plurality of photo-detectors with a reference signal and outputting signals in the form of a binary signal. An identifying circuit is provided which is connected to the outputs of the first, second and third comparators. The identifying circuit identifies one of the plurality of photo-detectors which provides a different output from outputs of the remaining photo-detectors and selects a high output level photo-detector from two photo-detectors adjacent to the identified photo-detector based on an output of one of the plurality of second comparators which compares the outputs of two photo-detectors adjacent to the identified photo-detector. The identifying circuit further selects two light illumination segments from three light illumination segments corresponding to the identified photo-detector. One of the selected light illumination segment is disposed at a side of the selected photo-detector and another selected light illumination segment at a center of the three light illumination segments corresponding to the identified photo-detector. When the output of the third comparator corresponding to the identified photo-detector is at a high-level, the light illumination segment disposed at the center of the three light illumination segments is selected from the two selected light illumination segments as the one on which a light is incident whereas when the output of the third comparator corresponding to the identified photo-detector is at a low-level, the light illumination segment disposed at the side of the selected photo-detector is selected from the two selected light illumination segments as the one on which the light is incident.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

Preferred embodiments of the present invention will now be described with reference to the accompanying drawings.

Figure 1:
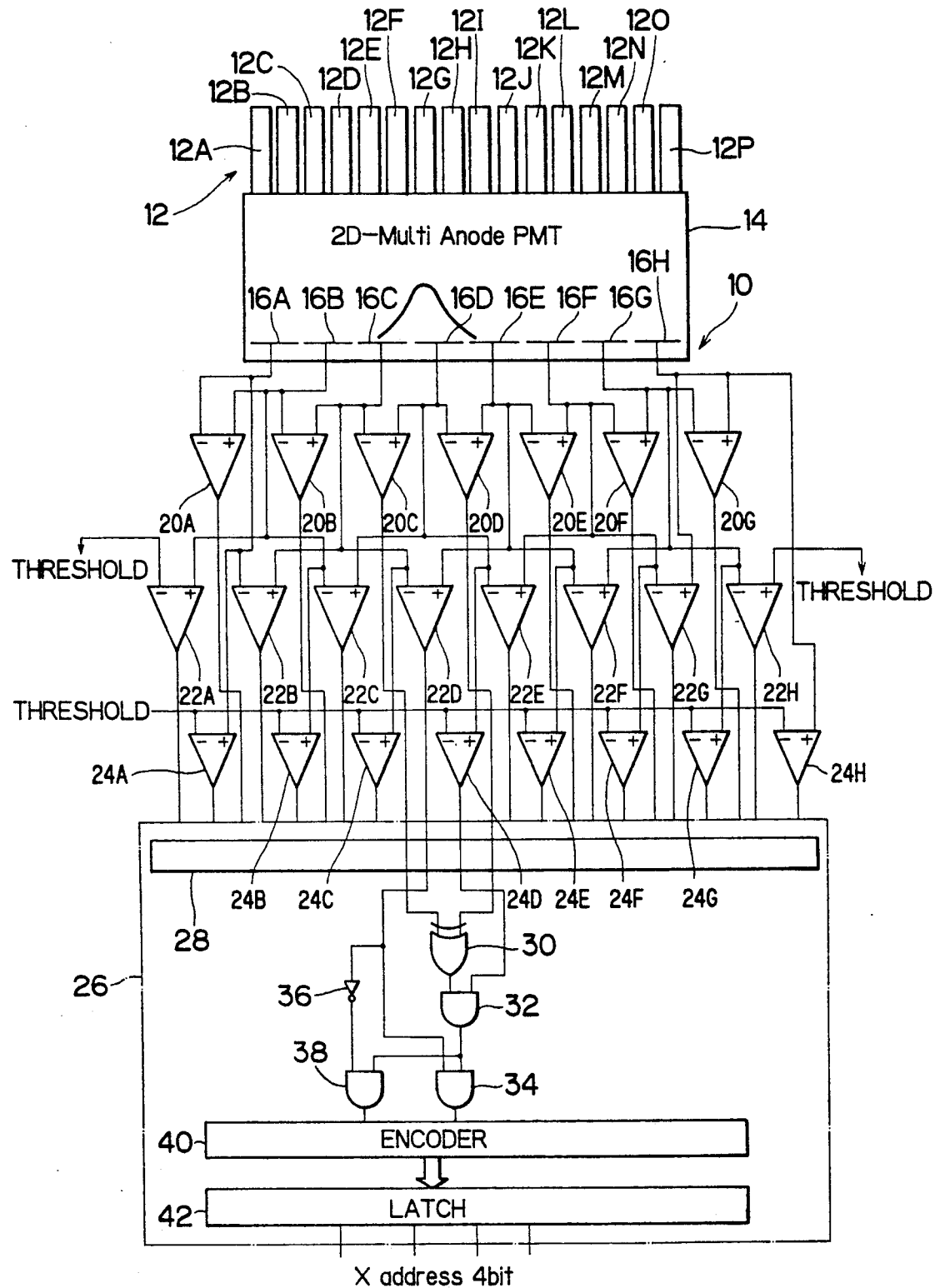
FIG. 1 is a circuit diagram showing a position detector according to a first embodiment of the present invention.

As shown in FIG. 1, the position detector 10 according to a first embodiment of the present invention includes a scintillator array 12. For the sake of brevity, the illustrated scintillator array 12 consists of 16 rectangular-shaped scintillation crystals 12A through 12P which are juxtaposed along a line so that light receiving faces of the crystals 12A through 12P are in confrontation with a γ ray source (not shown). The actual arrangement of the scintillator array 12 is, however, of a matrix form wherein a plurality of scintillation crystals are arranged two-dimensionally. There is provided a two-dimensional multi-anode photomultiplier tube (2D-multi anode PMT) 14 disposed at the light output side of the scintillator array 12. The 2D-multi anode PMT 14 includes 8 anodes 16A through 16H provided in one-to-two correspondence to the double number of the scintillation crystals 12A through 12P.

A first comparator group including 7 comparators 20A through 20G is connected to the output of the 2D-multi anode PMT 14 so that inputs of each comparator are connected to two adjacent anodes of the 2D-multi anode PMT 14 for comparison of the outputs from the two adjacent anodes. Specifically, the inverting and non-inverting inputs of the first comparator 20A is connected to the anodes 16A, 16B, respectively. The inverting and non-inverting inputs of the second comparator 20B is connected to the anodes 16B, 16C, respectively. Each of the remaining comparators are also connected to the corresponding two anodes in the similar fashion.

A second comparator group including 8 comparators 22A through 22H is also connected to the outputs of the 2D-multi anode PMT 14 so that the inputs of each of 6 comparators 22B through 22G are connected to two alternately disposed anodes of the 2D-multi anode PMT 14 for comparison of these anode outputs. Specifically, the inverting and non-inverting inputs of the comparator 22B are connected to the first and third anodes 16A and 16C, respectively. The inverting and non-inverting inputs of the comparator 22C are connected to the second and fourth anodes 16B and 16D, respectively. Each of the remaining comparators 22D through 22G are connected to the corresponding anodes in the similar fashion. The non-inverting input of the leftmost comparator 22A is connected to the second anode 16B but the inverting input thereof is supplied with a threshold value for detecting the status of the leftmost scintillation crystal 12A. Likewise, the inverting input of the rightmost comparator 22H is connected to the anode 16G and the non-inverting input thereof is supplied with a threshold value for detecting the status of the rightmost scintillation crystal 12P.

The fourth comparator group is further provided which consists of 8 comparators 24A through 24H connected respectively to the anodes 16A through 16H for comparing the outputs from the anodes with a threshold value. Specifically, the non-inverting inputs of the respective comparators 24A through 24H are connected to the corresponding anodes of the 2D-multi anode PMT 14, and the inverting inputs thereof are supplied with a common threshold value.

The position detector 10 further includes an identifying circuit 26 which identifies the light emitting scintillation crystal based on the outputs of the first, second and fourth comparator groups. The identifying circuit 26 includes a first latch circuit 28 for latching the outputs of the first, second and fourth group comparators 20A to 20G, 22A to 22H, and 24A to 24H. The identifying circuit 26 further includes 8 gate circuits, each including an exclusive-OR gate 30, first, second, and third AND gates 32, 34, 38 and an invertor 36. For the sake of brevity, only one gate circuit is shown in FIG. 1. The identifying circuit 26 further includes an encoder 40 and a second latch circuit 42.

The exclusive-OR gate 30 has two inputs respectively connected to the outputs of two adjacent first group comparators. The exclusive-OR gate 30 has one input connected to the output of the comparator 20C which compares the outputs of the leftside anode 16C and the center anode 16D among three neighboring anodes 16C through 16E, and the other input connected to the output of the comparator 20D which compares the outputs of the center anode 16D and the rightside anode 16E. The first AND gate 32 has two inputs, one connected to the output of the exclusive-OR gate 30 and the other to the output of the fourth group comparator corresponding to the center anode of the three neighboring anodes. In FIG. 1, one input of the first AND gate 32 is connected to the output of the comparator 24D whose non-inverting input is connected to the anode 16D positioned centrally of the three anodes 16C, 16D and 16E.

The second AND gate 34 has two inputs, one connected to the output of the first AND gate 32 and the other to the output of the corresponding second group comparator 22D whose inputs are connected to the leftside and rightside anodes of the center anode 16D.

The connection of the third AND gate 38 is similar to that of the second AND gate 34 but one input of the third AND gate 38 is connected through the invertor 36 to the output of the same second group comparator 22D. The other input of the third AND gate 38 is connected to the output of the first AND gate 32. The encoder 40 receives the outputs of the second and third AND gates 34, 38 and converts the outputs thereof to a 4-bit address signal. The second latch circuit 42 is connected to the encoder 40 for latching the 4-bit address signal outputted from the encoder 40.

In operation, assuming that γ ray is incident on the seventh scintillation crystal 12G counted from the left and light is emitted therefrom, photoelectrons produced resulting from the incident of the γ ray are multiplied by the PMT 14. The multiplied photoelectrons are received at the third and fourth anodes 16C, 16D. Eventually, the photoelectrons may be received at the fifth anode 16E. The anodes receiving the photoelectrons produce output signals whose levels are determined depending on the number of photoelectrons received at the respective anodes.

Each of first group comparators 20A through 20G is connected to the corresponding two anodes in such a manner that the inverting input of the comparator is connected to the leftside anode and the non-inverting input thereof to the rightside anode. Therefore, upon receipt of the output signals from the corresponding anodes, the first to third comparators 20A through 20C of the first comparator group produce H-level signals whereas at least the comparator 20D produces an L-level signal. The outputs of the comparators 20A, 20F and 20G are not determinative as the photoelectrons are substantially not received at the anodes corresponding to those comparators. Regardless of whether the outputs of the comparators 20A, 20F and 20G are at H-level or L-level, the outputs of those comparators are invalidated by the first AND gate 32 on the basis of the outputs obtained from the fourth group comparators, as will be described later.

Based on the change in level of the outputs of the first group comparators, it can be appreciated that the γ ray is incident on either the scintillation crystal 12G or 12H with which the anode 16D confronts. The exclusive-OR gate 30 connected to the comparators 20C and 20D are enabled and produces an H-level signal, as H-level and L-level signals are applied to the inputs of the exclusive-OR gate 30. The remaining five exclusive-OR gates are disabled as a combination of H-level and L-level signals are applied to the inputs of each of these exclusive-OR gates.

As illustrated in FIG. 1, the peak of a photoelectron distribution curve representative of the number of photoelectrons received at the anodes is substantially on the anode 16D but is slightly on the side of the leftside anode 16C. Therefore, the output of the anode 16C is greater than that of the anode 16E, hence the comparator 22D which compares the outputs of the anodes 16C and 16E produces an L-level signal.

The fourth group comparators 24A through 24H determines if the outputs of the corresponding anodes 16A through 16H are above the threshold level. When the ray is incident on the scintillation crystal 12G, only the output of the comparator 24D corresponding to the anode 16D is above the threshold level. Consequently, only the comparator 24 produces an H-level signal. The first AND gate 32 is therefore rendered enabled and produces an H-level signal, as it is supplied with H-level signals from both the exclusive-OR gate 30 and the comparator 24D.

Since the output of the comparator 22D is at L-level and the output of the exclusive-OR gate 30 is at H-level, the second AND gate 34 produces an L-level signal. At this time, the third AND gate 38 produces an H-level signal, because the inverted output of the comparator 22D by virtue of the invertor 36 and the output of the first AND gate 32 are applied to the inputs of the third AND gate 38. The L-level and H-level outputs from the second and third AND gates 34, 38 are applied to the encoder 40 where the two bit input signal applied to the predetermined input terminals of the encoder 40 is converted to a 4-bit address signal which in turn is outputted to the second latch circuit 42. The 4-bit address signal thus outputted indicates the fact that the γ ray is incident on the scintillation crystal 12G.

Figure 3:
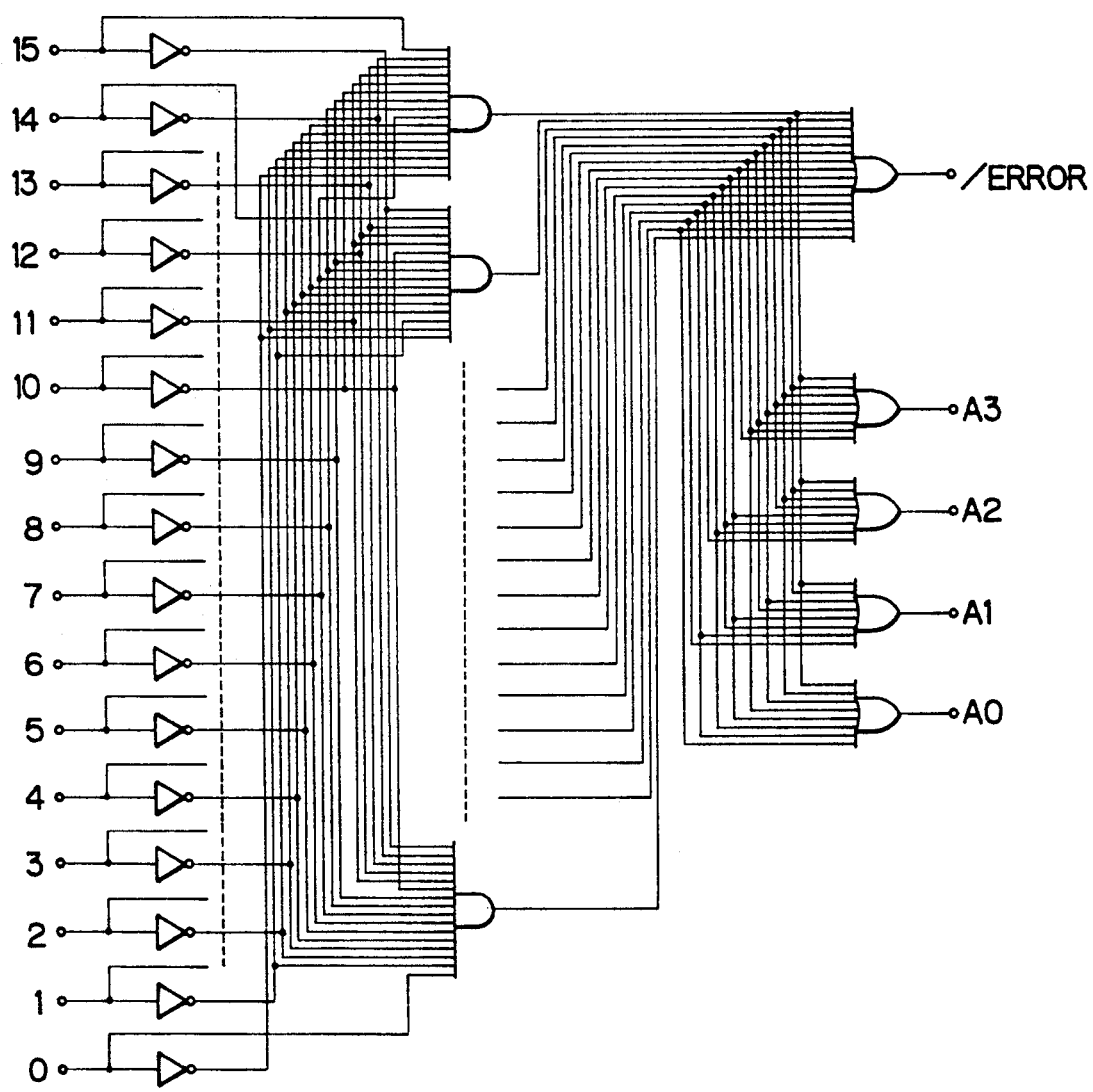
FIG. 3 is a circuit diagram showing an encoder used in the position detector shown in FIG. 1.

FIG. 3 shows a circuit arrangement of the encoder 40. The circuit shown therein is of a 16-input and 4-bit address output configuration. The 16 input terminals numbered from 0 to 15 correspond to the outputs of the second AND gate 34 and the third AND gate 38. The circuit also has an error output (/ERROR) from which an error signal is produced when two input signals are simultaneously applied to any two of the 16-input.

In the first embodiment, it is desirable to provide a preamplifier to each of the anodes 16A through 16H to thereby adjust the gain of the anode output.

Figure 4:
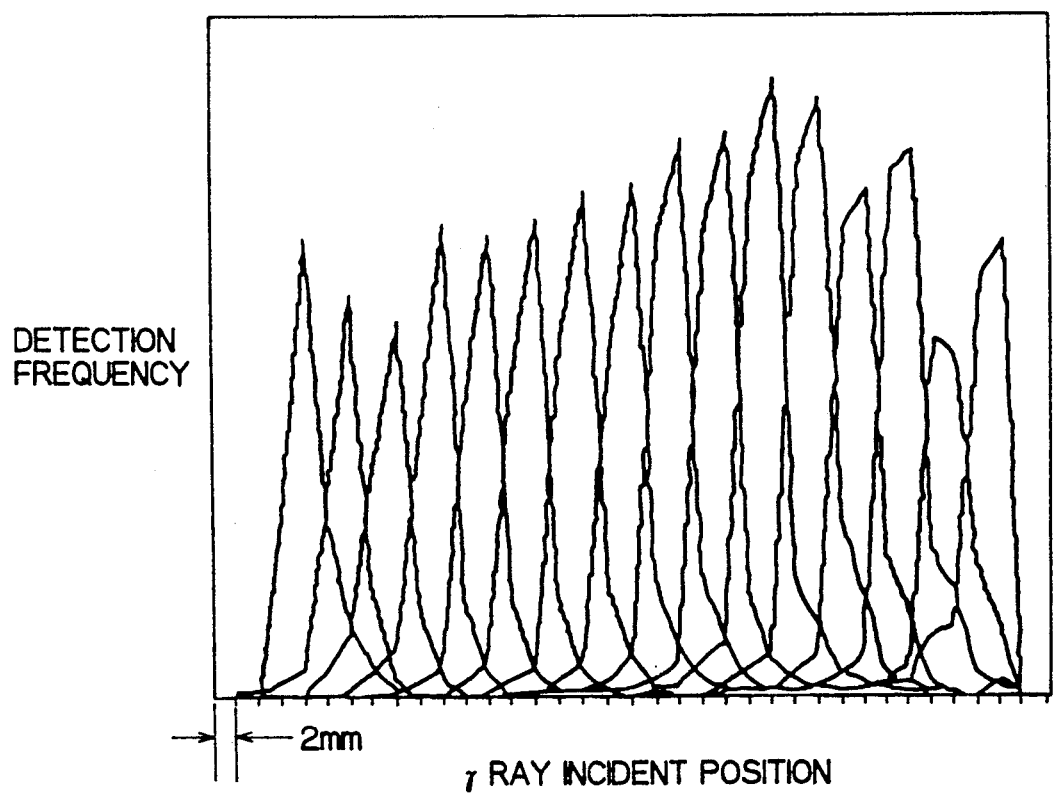
FIG. 4 is a graphical representation illustrating a relationship between γ ray incident positions and detection frequency achieved by the first embodiment of the present invention.

FIG. 4 is a graph indicating the number of detections or detection frequency of the γ ray incident on the respective scintillation crystals according to the position detector of the present invention. The two-dimensional multi-anode photomultiplier tube used herein has anodes arranged at 8 mm pitch. A BGO scintillator array arranged at 4 mm pitch is coupled to the photomultiplier tube.

Figure 2:
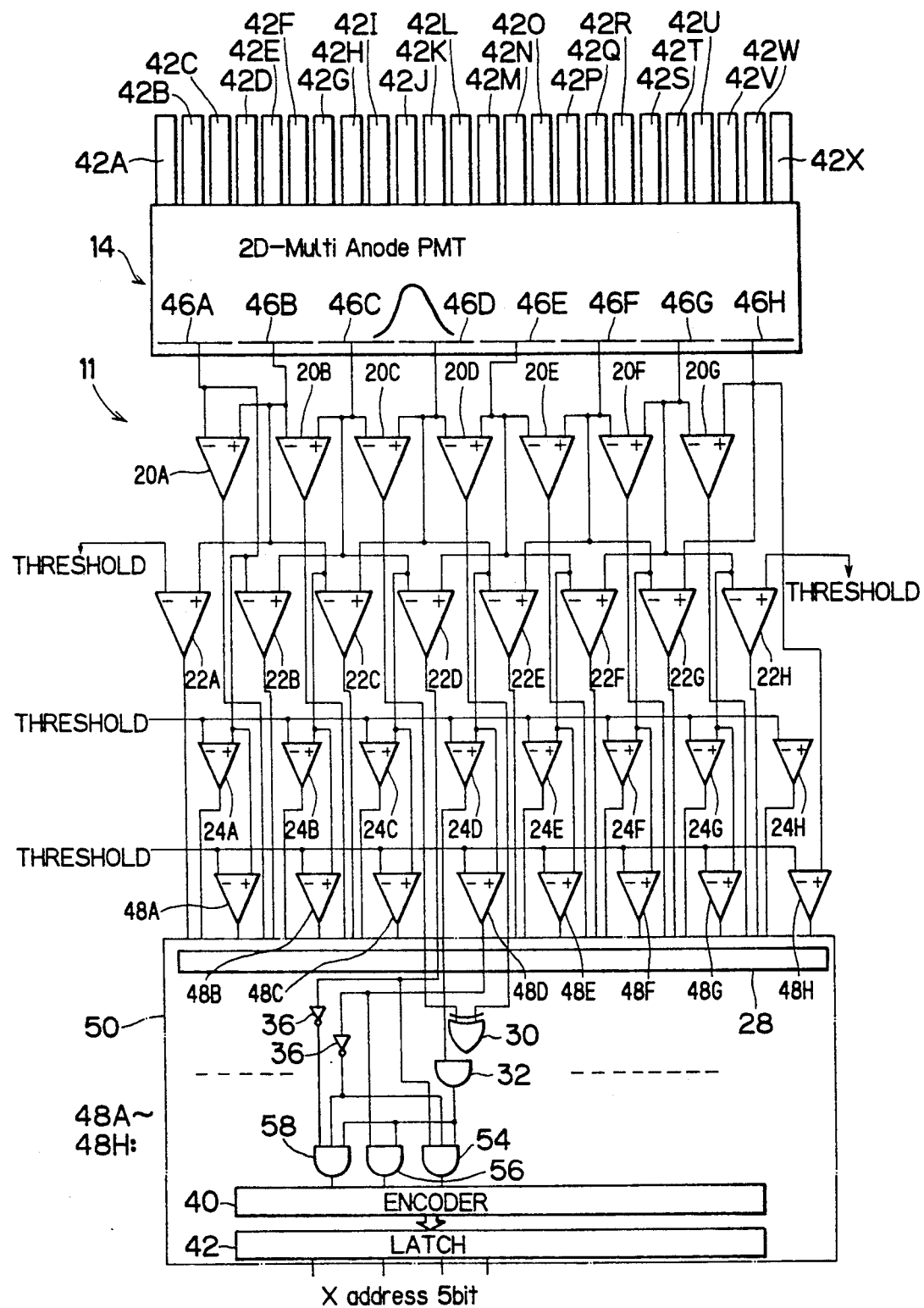
FIG. 2 is a circuit diagram showing a position detector according to a second embodiment of the present invention.

Referring to FIG. 2, a second embodiment of the present invention will next be described. The position detector according to the second embodiment reduces the number of anodes of the photomultiplier tube. In the illustrated embodiment, 8 anodes 46A through 46H are provided for 24 scintillation crystals 42A through 42X. Specifically, the anodes and the scintillation crystals are provided in one-to-three correspondence.

The arrangement shown in FIG. 2 is similar to that shown in FIG. 1 but differs therefrom in the provision of the anodes 46A through 46H in one-to-three correspondence to the scintillation crystals 42A through 42X, the provision of third group comparators 48A through 38H, and the configuration of the identifying circuit 50. Same reference numerals used in FIG. 1 denotes the same components in FIG. 2, thus duplication description thereof is omitted herein.

Each of fourth group comparators 48A through 48H is provided to compare the output of the corresponding anode with a threshold level. The threshold level is determined so as to be less than the output of the anode obtained when the light is incident on the center scintillation crystal of the corresponding three scintillation crystals but greater than the output of the anode obtained when the light is incident on one side scintillation crystal of the corresponding three scintillation crystals.

The identifying circuit 50 includes a latch circuit 28 similar to the latch circuit 26 of FIG. 1, an exclusive-OR gate 30, and a first AND gate 32. The identifying circuit 50 further includes second, third and fourth AND gates 54, 56, and 58 for selecting one light incident scintillator crystal among the three associated crystals. The fourth AND gate 58 has three inputs to which applied are the output of the first AND gate 32, the inverted output of the second comparator 22D by virtue of an invertor 36, and the inverted output of the third group comparator 48D by virtue of another invertor 36.

The third AND gate 56 has two inputs to which applied are the output of the first AND gate 32 and the output of the third comparator 48D. The second AND gate 54 has three inputs to which applied are the output of the first AND gate 32, the output of the second group comparator 22D, and the inverted output of the comparator 48D by virtue of the invertor 36.

Assuming that the γ ray is incident on the tenth scintillation crystal 42J counted from the left and that scintillation crystal 42J is illuminating, the number of photoelectrons produced resulting from the illumination of the scintillation crystal 42J are multiplied by the photomultiplier tube 14. The multiplied photoelectrons are received at the third and fourth anodes 46C and 47D which in turn produce outputs signals. The fifth anode 46E may receive photoelectrons and produces a corresponding output signal.

Each of first comparators 20A through 20G compares the outputs of two adjacent anodes. The inverting input of each comparator is connected to the left side scintillation crystal of the corresponding two crystals and the non-inverting input thereof to the right side scintillation crystal. Therefore, under the assumption made herein, the outputs of the leftside three comparators 20A, 20B and 20C are at H-level whereas the outputs of the remaining comparators 20D through 20G are at L-level. From the transition of the output levels of the first comparators, it can be understood that the γ ray is incident on any one of the scintillation crystals 42J, 42K and 42L corresponding to the anode 46D. The outputs of the comparators 20A, 20F and 20G are not determinative because no substantial inputs are applied to these comparators from the corresponding anodes. The outputs of the comparators 20A, 20F and 20G are thus invalidated by the fourth comparators to be described later.

H-level and L-level signals outputted from the first group comparators 20C and 20D are applied to the inputs of the exclusive-OR gate 30. Therefore, an H-level signal is outputted from the exclusive OR-gate 30. To the remaining exclusive-OR gates, either two H-level inputs or two L-level inputs are applied, so that the outputs from those exclusive-OR gates are at L-level.

As illustrated in FIG. 2, the peak level of the photoelectron distribution curve is substantially on the anode 46D but is slightly on the side of the anode 46C. As a result, the output of the anode 46C is greater than the output of the anode 46E, so that the output of the second comparator 22D which compares the outputs of the anodes 46C and 46E disposed at both sides of the anode 46D is at L-level. Since the photoelectrons are received at the anode 46D, the fourth group comparator 24D which compares the output of the anode 46D with the threshold level outputs a H-level signal to the first AND gate 32. The AND gate 32 also receives the H-level output of the exclusive-OR gate 30. Consequently, the AND gate 32 outputs an H-level signal to the second, third and fourth AND gates 54, 56 and 58.

The third group comparator 48D which determines whether the photoelectron distribution is present above the center of the anode 46D outputs an L-level signal. Accordingly, the third AND gate 56 receiving at its inputs the L-level signal from the third group comparator 48D and the output from the first AND gate 32 outputs an L-level signal. From this fact, it can be confirmed that no output is available from the center scintillation crystal 42K of the three neighboring crystals.

The second comparator 22D which compares the outputs of the anodes 46C and 46E disposed at both sides of the anode 46D outputs the L-level signal, since the peak of the photoelectron distribution in the anode 46D is on the side of the anode 46C. The L-level signal from the second comparator 22D is inverted by the invertor 36 and the H-level signal is applied to one input of the fourth AND gate 58. The L-level output signal from the third comparator 48D is also inverted by the invertor 36. Accordingly, all the inputs to the fourth AND gate 58 are at H-level, so that the fourth AND gate 58 outputs an H-level signal. On the other hand, since the second AND gate 54 receives at its input the L-level signal fed from the second comparator 22D, the second AND gate 54 outputs an L-level signal.

As described, only the fourth AND gate 58 outputs the H-level signal, whereby detection is made so that the light is illuminated from the leftside scintillation crystal of the three crystals corresponding to the anode 46. In the illustrated embodiment, although the common threshold level is applied to all the third comparators 48A through 48H, the threshold levels to the respective third comparators may be set independently of one another.

Although the present invention has been described with respect to specific embodiments, it will be appreciated by one skilled in the art that a variety of changes may be made without departing from the scope of the invention. For example, while in the illustrated embodiments a photomultiplier tube is used to multiply the photoelectrons resulting from the illumination of any one of the scintillation crystals 12A through 12P or 42A through 42X, it is possible to use a combination of a photo-electric converter and a plurality of anode segments adapted to receive converted electric signals supplied from the photo-electric converter. Alternatively, a semiconductor detector can be used in lieu of the photomultiplier tube. Further, the illustrated identifying circuit can be modified in such a manner that 16 or 24 outputs obtained from the AND gates to be applied to the encoder can be directly applied to a counter, whereby the distribution of the γ ray incident positions can be detected.

While the illustrated position detectors are intended to be used in conjunction with a positron CT, they can be used extensively in conjunction with various devices, such as light or radiant ray incident position detecting devices, or scintillation cameras, to identify the position of light illuminating segment.

What is claimed is:
1. A position detector comprising:
   a plurality of light illumination segments aligned to one another;
   a plurality of photo-detectors aligned and provided in one-to-two correspondence to adjacent two of said plurality of light illumination segments, said plurality of photo-detectors having outputs;
   a plurality of first comparators aligned and connected to the outputs of said plurality of photo-detectors, for comparing outputs of adjacent two photo-detectors and outputting a comparison result in the form of a binary signal from an output of each of said plurality of first comparators;

a plurality of second comparators aligned and connected to the outputs of said plurality of photo-detectors, for comparing outputs of two photo-detectors disposed one photo-detector apart and outputting a comparison result in the form of a binary signal from an output of each of said plurality of second comparators; and an identifying circuit connected to the outputs of said plurality of first comparators and said plurality of second comparators, for identifying one of said plurality of photo-detectors which provides a different output from outputs of the remaining photo-detectors, for selecting a higher output level photo-detector from two photo-detectors adjacent to the identified photo-detector based on an output of one of said plurality of second comparators which compares the outputs of two photo-detectors adjacent to the identified photo-detector, and for identifying one of the two light illumination segments corresponding to the identified photo-detector and disposed at a side of the higher output level photo-detector as the one on which a light is incident.

2. The position detector according to claim 1, wherein said identifying circuit comprises:

an exclusive-OR gate having a first input connected to one of said plurality of first comparators which compares outputs of first and second photo-detectors of three adjacent photo-detectors, a second input connected to another one of said plurality of first comparators which compares outputs of second and third photo-detectors of the three adjacent photo-detectors, and an output;

a first AND gate having a first input receiving a signal outputted when the output of said second photo-detector is greater than a predetermined threshold level, a second input connected to the output of said exclusive-OR gate, and an output providing an ANDed signal of two inputs;

a second AND gate having a first input connected to an output of one of said plurality of second comparators comparing the outputs of said first and third photo-detectors, a second input connected to the output of said first AND gate;

an invertor having an input connected to the output of one of said plurality of second comparators comparing the outputs of aid first and third photo-detectors, and an output; and a third AND gate having a first input connected to the output of said invertor and a second input connected to the output of said first AND gate.

3. The position detector according to claim 2, wherein said identifying circuit further comprises an encoder having inputs connected to the outputs of said second and third AND gates for producing an address signal representative of a position of one of said plurality of light illumination segments on which a light is incident.

4. The position detector according to claim 1, further comprising a plurality of preamplifiers provided in one-to-one correspondence to said plurality of photo-detectors.

5. The position detector according to claim 1, wherein each of said plurality of light illumination segments comprises a scintillation crystal.

6. A position detector comprising:
a plurality of light illumination segments aligned to one another;

a plurality of photo-detectors aligned and provided in one-to-three correspondence to adjacent three of said plurality of light illumination segments, said plurality of photo-detectors having outputs;

a plurality of first comparators aligned and connected to the outputs of said plurality of photo-detectors, for comparing outputs of adjacent two photo-detectors and outputting a comparison result in the form of a binary signal from an output of each of said plurality of first comparators;

a plurality of second comparators aligned and connected to the outputs of said plurality of photo-detectors, for comparing outputs of two photo-detectors disposed one photo-detector apart and outputting a comparison result in the form of a binary signal from an output of each of said plurality of second comparators;

a plurality of third comparators provided in one-to-one correspondence to said plurality of photo-detectors for comparing the outputs of said plurality of photo-detectors with a reference signal and outputting signals in the form of a binary signal; and an identifying circuit connected to the outputs of said first, second and third comparators, for identifying one of said plurality of photo-detectors which provides a different output from outputs of the remaining photo-detectors, for selecting a higher output level photo-detector from two photo-detectors adjacent to the identified photo-detector based on an output of one of said plurality of second comparators which compares the outputs of two photo-detectors adjacent to the identified photo-detector, and for selecting two light illumination segments from three light illumination segments corresponding to the identified photo-detector, one of the selected light illumination segment being disposed at a side of the selected photo-detector and another selected light illumination segment being disposed at a center of the three light illumination segments corresponding to the identified photo-detector, wherein when the output of said third comparator corresponding to the identified photo-detector is at a high-level, the light illumination segment disposed at the center of the three light illumination segments is selected from the two selected light illumination segments as the one on which a light is incident whereas when the output of said third comparator corresponding to the identified photo-detector is at a low-level, the light illumination segment disposed at the side of the selected photo-detector is selected from the two selected light illumination segments as the one on which the light is incident.

7. The position detector according to claim 6, wherein said identifying circuit comprises:

an exclusive-OR gate having two inputs connected to the outputs of two selected first comparators which compares selected two outputs of three adjacent photo-detectors, said exclusive-OR gate having an output;

a first AND gate having a first input receiving a signal outputted when the output of a center photo-detector of said three adjacent photo-detectors is greater than a predetermined threshold level, a second input connected to the output of said exclusive-OR gate, and an output providing an ANDed signal of two inputs;

a second AND gate having a first input connected to an output of one of said plurality of second comparators comparing the outputs of two side photo-detectors of said three adjacent photo-detectors, a second input receiving an inverted output of said third comparator corresponding to said photo-detector, and a third input connected to the output of said first AND gate;

a third AND gate having a first input connected to the output of said third comparator corresponding to said center photo-detector, and a second input connected to the output of said first AND gate; and a fourth AND gate having a first input receiving an inverted output of said second comparator, a second input receiving an inverted output of said third comparator corresponding to said photo-detector, and a third input connected to the output of said first AND gate.

8. The position detector according to claim 7, wherein said identifying circuit further comprises an encoder having inputs connected to the outputs of said second, third and fourth AND gates for producing an address signal representative of a position of one of said plurality of light illumination segments on which a light is incident.

9. The position detector according to claim 6, further comprising a plurality of preamplifiers provided in one-to-one correspondence to said plurality of photo-detectors.

10. The position detector according to claim 7, wherein each of said plurality of light illumination segments comprises a scintillation crystal.

* * * * *